Aug. 7, 1956
A. D. SIPE
2,757,430
MOLDING MACHINE FOR COMPRESSED CEMENT PRODUCTS
Filed Oct. 24, 1952
2 Sheets-Sheet 1
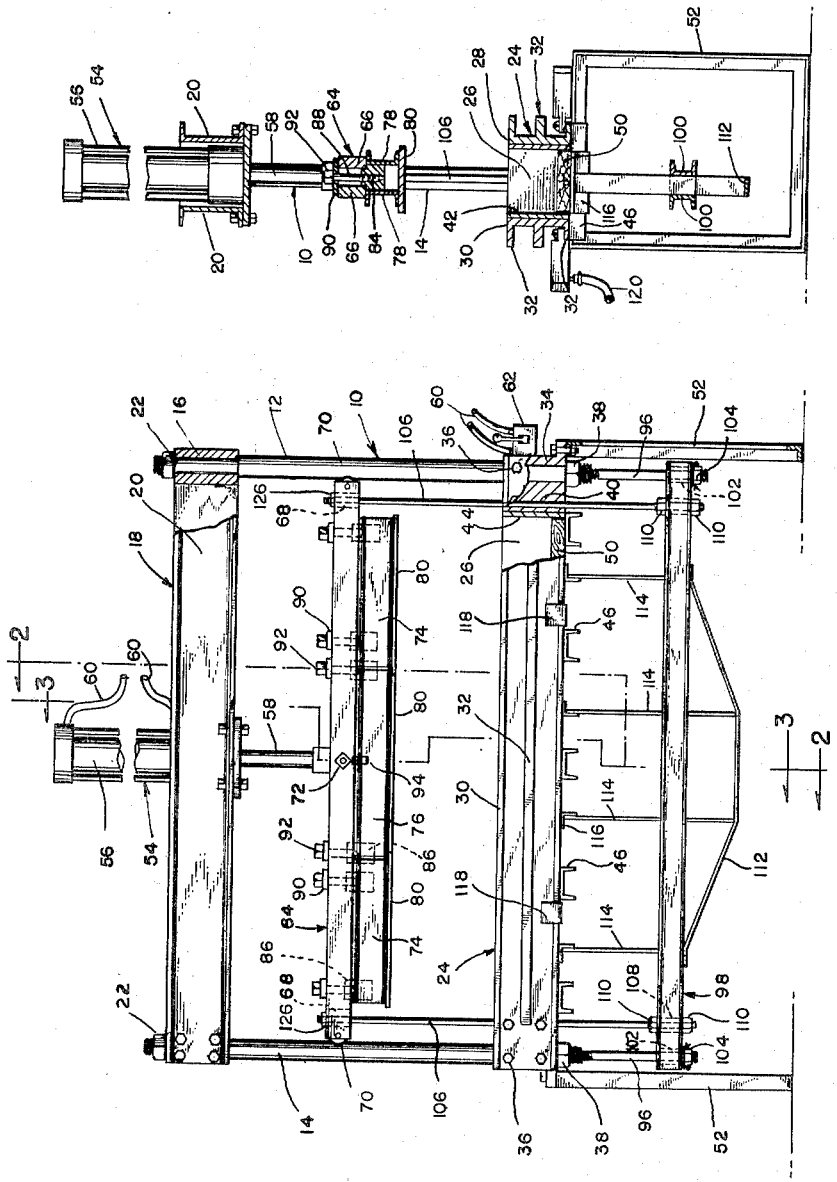
INVENTOR.
ARTHUR D. SIPE.
BY
ATTORNEY

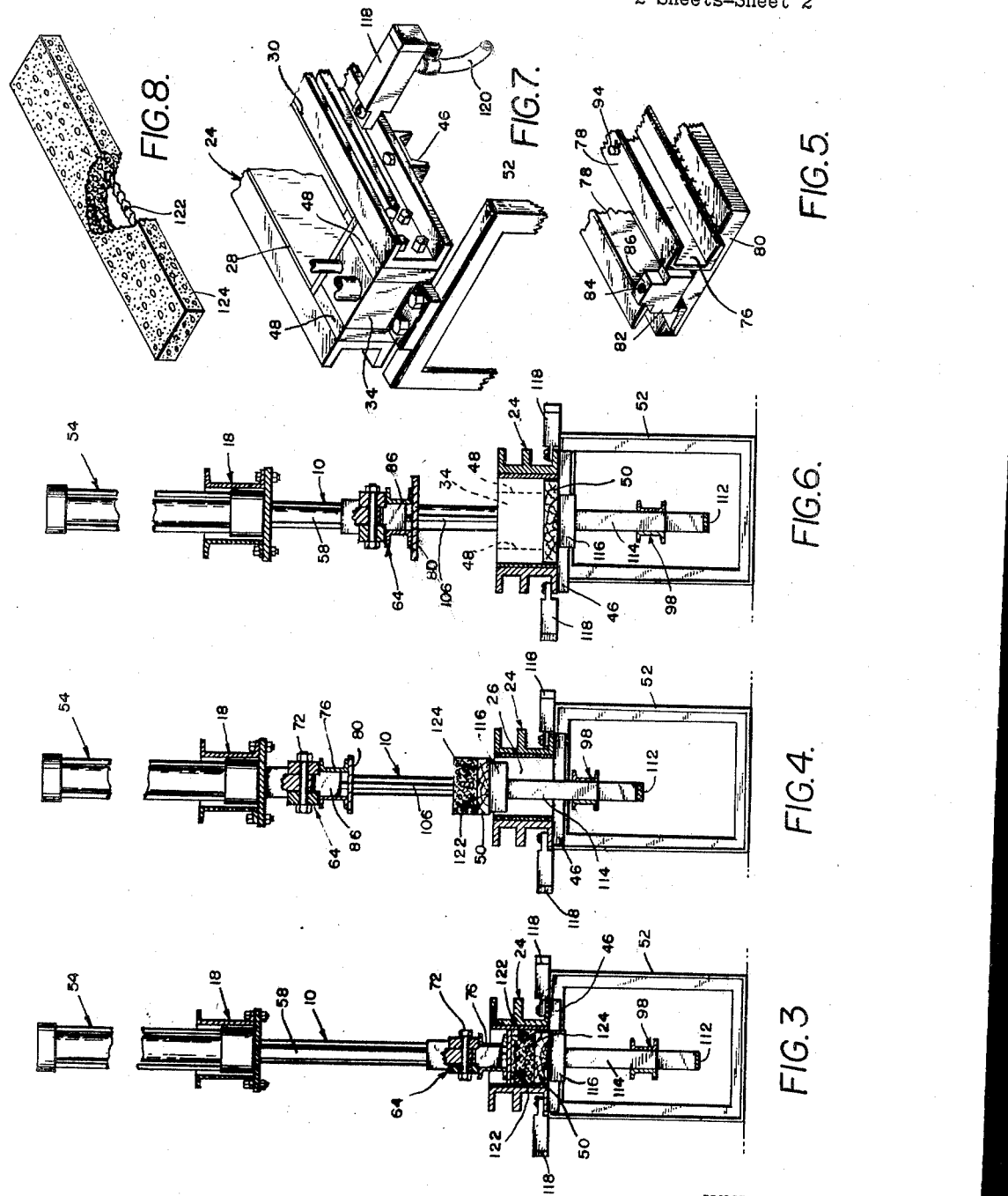

United States Patent Office 2,757,430
Patented Aug. 7, 1956

2,757,430
MOLDING MACHINE FOR COMPRESSED CEMENT PRODUCTS

Arthur D. Sipe, Dallastown, Pa.

Application October 24, 1952, Serial No. 316,623

7 Claims. (Cl. 25—45)

The present invention relates to a molding machine for making cement block-like products, and particularly products molded from Portland cement mixtures. The molding machine, although not restricted thereto, is preferably designed to make elongated cement products such as lintels, posts, pillars and the like.

Machines for making conventional cement blocks are well known but relatively few machines have been designed for making elongated cement products such, for example, as lintels, posts, and pillars. Such machines that have been developed are of a nature that require a relatively dry cement mixture whereas the use of a wetter mixture would insure a stronger product. Furthermore, the use of a relatively dry mixture permits the formation of voids within the product and the density thereof is not uniform. Of course, hand manufacturing or molding elongated cement products such as lintels, including the laborious functions of filling a mold and tamping the same by hand, levelling the mold by hand and manually unclamping the mold from the molded product, is still quite commonly in use, especially in rather small plants.

It is an object of the present invention to provide a molding machine particularly suited for manufacturing elongated cement products such as lintels, posts, pillars and the like by power operated means, whereby manual operations are reduced to a minimum.

It is another object of the invention to provide a molding machine of this type in which a relatively wet cement mixture preferably is used, whereby the occurrence of voids in the product is substantially eliminated and such product has a substantially uniform density throughout.

It is a further object of the invention to provide a molding machine having a power operated compression head operable to compress a batch of cement mixture within a mold cavity of predetermined size, vibrating means also being provided to vibrate the mold both before and during compression of the product within the mold cavity, whereby the large aggregate within the mixture will be insured of coverage by cement and small aggregate and, in general, the aggregate particles automatically become nested and water within the mixture is moved to the outer surfaces of the product to produce an improved finish surface on the molded product as well as eliminating voids and increasing the density to a maximum.

It is still another object of the invention to provide a molding machine which is relatively simple in operation, strong and durable, easy to operate, and also may readily be cleaned at the conclusion of molding operations therewith.

One further object of the invention is to provide a mold box which may be adjustable both as to length and width and the compression head of the machine is similarly variable, whereby the machine is capable of producing a relatively wide variety of sizes of especially elongated cement products.

Details of the foregoing objects and of the invention as well as other objects thereof are set forth in the following specification and illustrated in the drawings comprising a part thereof.

In the drawings:

Fig. 1 is a front elevation of an exemplary embodiment of molding machine embodying the principles of the present invention.

Fig. 2 is a vertical sectional elevation taken on the line 2—2 of Fig. 1, this view illustrating the machine conditioned to receive a batch of cement mixture for molding.

Fig. 3 is a view similar to Fig. 2 taken on the line 3—3 of Fig. 1, said view showing an exemplary cement lintel being compressed and vibrated.

Fig. 4 is a view similar to Fig. 3 but showing the compression head and ejecting means elevated to remove a compressed cement product such as a lintel from the machine for removal to a curing rack.

Fig. 5 is a fragmentary perspective view of one end of one of the compression members of the compression head of the machine.

Fig. 6 is a view similar to Fig. 2 but showing the mold box and compression head of the machine expanded for purposes of making a wider cement product than illustrated in Figs. 2 through 4.

Fig. 7 is a fragmentary perspective view showing one end of the mold box illustrated in Fig. 6 and the means by which said mold box has been expanded to a greater width than the mold boxes shown in Figs. 2 through 4.

Fig. 8 is a perspective view, partly broken away, illustrating in exemplary manner a molded and compressed product such as a steel reinforced lintel.

Referring to the drawings, the present invention comprises a molding machine including a frame 10. Said frame comprises spaced vertical members 12 and 14 which in the exemplary illustration, comprise cylindrical rods. The upper end of each rod is preferably reduced in diameter and is received within an aperture in block 16 as clearly shown in Fig. 1. A header 18 comprises a pair of spaced channel members 20 which are connected at their ends to the blocks 16 that receive the upper ends of the vertical members 12 and 14. Nuts 22 effectively clamp the header 18 to the upper ends of members 12 and 14.

Between the header 18 and the base of the machine is an elongated mold box 24 having a cavity 26. Said mold cavity comprises spaced side members 28 and 30 which preferably are channel members having flanges 32 which project outwardly from the cavity 26. The flanges 32 reinforce the side members 28 and 30. The ends of the side members 28 and 30 have the inner surfaces thereof secured to end members 34 which preferably comprise iron castings or steel blocks, said blocks forming the ends of the mold box 24. If desired, the side members 28 and 30 may be detachably secured to the end members 34 by a plurality of bolts 36.

The blocks comprising end members 34 are vertically apertured to receive the lower ends of the vertical members 12 and 14 which are reduced in diameter similarly to the upper ends thereof, whereby said lower ends of the vertical members may securely be clamped to the end members of the mold box 24 by nuts 38. The end members 34 are also provided with vertical guide bearings 40 for purposes to be described. If desired, the mold box 24 may be provided with side liner plates 42 and end liner plates 44 which sustain all wear on the mold box, whereby upon said plates becoming worn beyond further use, the same may readily be replaced and thereby save the expense of replacing the entire side flange members 28 and 30 as well as the end members 34.

Secured to the lower portion of the mold box 24 are a plurality of pallet supporting means comprising channel members 46 which extend across the open bottom of the mold cavity 26. These members 46 may be secured to the lower flanges 32 of the side members 28 and 30 by bolts, especially where it is desired to provide a laterally expansible mold box for purposes of making wider products. This can be effected readily by inserting filler blocks 48 between the inner surfaces of the end members 34 and the ends of the side members 28 and 30. However, if width adjustability of the mold is not desired, the channel members 46 may readily be secured to the flanges 32 by riveting or welding and the like.

The open bottom of the mold box 24 is normally closed by a pallet 50 which is preferably a wooden plank closely conforming at its edges to the dimensions in plan view of the cavity 26. The pallet 50 is supported within the lower portion of the mold cavity by the channel members 46 as aforesaid.

The frame of the machine also comprises base members 52 which in the exemplary illustration are in the form of rectangular frames made from angle iron or otherwise, the upper ends of said members being bolted to the end members 34 as clearly shown in Fig. 1.

A hydraulic unit 54 is secured to the header 18 in any suitable manner, said unit comprising a hydraulic cylinder 56 and a hydraulic piston from which a rod 58 extends. Suitable hydraulic lines 60 are connected to opposite ends of the cylinder 56, the same extending to a suitable source of hydraulic fluid, not shown, such as a conventional pump and/or pressure tank or reservoir. Passage of hydraulic fluid under pressure to either desired end of the cylinder is controlled by a conventional manual valve 62 attached to any suitable portion of the frame such as one of the end members 34 as shown in Fig. 1. For purposes of simplifying the illustration, the hydraulic lines 60 are only shown in fragmentary manner.

Vertically movable between the header 18 and the mold box 24 is a compression head 64, said head extending horizontally and comprising a pair of elongated spaced members 66 connected at their ends by suitable end blocks 68 which are vertically apertured for purposes to be described. The ends of the compression head 64 are also provided with rotatably mounted grooved anti-friction rollers 70 which engage the cylindrical vertical members 12 and 14.

The compression head 64 is secured centrally thereof to the lower end of hydraulic piston rod 58 such as by bolt 72. Said compression head also comprises a plurality of compression members 74 adjacent each end of the head and an intermediate compression member 76. One end of the intermediate compression member 76 is shown in fragmentary form in Fig. 5. Each of the compression members is formed from a pair of channel members 78. Said channel members are spaced from each other as shown in Figs. 2 through 6, and the lower flanges thereof are secured by welding or otherwise to a compression face plate 80. Also, positioning and clamping members 82, which are internally threaded at 84, are secured to said compression members adjacent opposite ends thereof by welding or any other suitable means.

The upper ends of the members 82 comprise lugs 86 which are suitably dimensioned to conform closely to the slot 88 between the spaced members 66 as clearly shown in Figs. 2 through 4 and 6 for purposes of positioning the compression members transversally relative to the spaced member 66 which comprise a supporting member of the compression head 64. Suitable clamping plates 90 extend across the upper end of the slot 88, these plates being apertured to receive clamping bolts 92, the lower ends of which are received within the threaded apertures 84 in the positioning lugs 86 on the clamping members 74 and 76.

The intermediate compression member 76 and the supporting member, comprising spaced members 66, are provided with interfitting lug and aperture positioning means 94 for purposes of accurately locating or positioning the intermediate compression member 76 longitudinally of the compression head 64 as shown in Fig. 1.

Further, the compression face plate 80 of the intermediate compression member 76 is shorter than the channel members 78 thereof, and the compression face plates of the end compression members 74 are longer than the channel members 78 thereof, thus affording interfitting projecting and recess means at opposite ends of the compression members 74 and 76 which accurately align the compression members in a transverse direction relative to the compression head 64.

The compression head structure described above affords a construction by which a relatively wide range of lengths of molded cement products may be formed by a machine embodying the principles of this invention. For example, the intermediate compression member 76 may be exchanged for other intermediate members of less or greater length, or the intermediate member may be dispensed with entirely and the two end members may be mounted end to end on the compression head 64 in instances where a relatively short product is desired. Under these circumstances, the end members 34 of the mold box 24 will have to be replaced by other end members of suitable length to provide a mold cavity complementary in plan view dimensions to the corresponding dimensions of the assembled compression face plates 80.

The machine is also provided preferably on the lower ends of the vertical members 12 and 14 with extension rods or members 96 which form guide and stop means for an ejecting member 98. Said ejecting member is composed of a plurality of channel members 100 secured at their ends to suitably spaced end blocks 102, said end blocks being vertically apertured to slidably receive the extension rods 96. The lower ends of the extension rods 96 are also threaded to receive stop nuts 104 which provide adjustable stop means for limiting the downward movement of the ejecting member 98. If desired, the extension rods 96 may be integral with members 12 and 14.

A pair of vertically adjustable connecting rods 106 are secured at the lower ends thereof to apertured blocks 108 between the channel members 100. The apertures in the blocks receive the rods 106, the lower ends of which are threaded for receiving adjustable clamping nuts 110. The rods 106 slidably extend through the guide bearings 40 and end members 34 and the upper ends of the rods slidably extend through suitable bearing apertures in the end blocks 68 of the compression head 64. Stop nuts 112 are secured to the upper threaded ends of rods 106 and the bearing apertures in end blocks 68 afford lost motion between head 64 and rods 106 to permit the compression head 64 to descend toward and into the mold box 24 after the stop nuts 104 have arrested the downward movement of the ejecting member 98 and, likewise, rods 106. It will thus be seen that the compression head 64 is afforded a greater amount of vertical movement than the ejecting member 98.

Ejecting member 98 is suitably reinforced by a metal strap 112 welded or bolted at its ends to the lower flanges of channel members 100. Projecting upward from ejecting member 98 is a plurality of pallet engaging members 114 which are provided at their upper ends with shoes or feet 116 in the nature of short sections of angle iron, the latter directly engaging the under surface of the pallet 50 as clearly shown in Figs. 2 through 4 and 6.

In order that the compacting and settling of the cement mixture deposited within the mold cavity 26 will be compacted a maximum amount so as to eliminate substantially all voids and increase the density of the product to a maximum degree, a plurality of either electric or pneumatic vibrating members 118 are bolted or otherwise secured preferably to the lower flanges 32 of the side members 28 and 30 of the mold box. These vibrators are connected by suitable electric or pneumatic conduits 120 to a switch or valve, not shown, but which for convenience may be fixed to the machine adjacent the hydraulic valve member 62 so as to be convenient for control purposes by a single operator also manipulating the control handle of the valve 62. The vibrators 118 are of conventional design and detailed description thereof is not believed to be necessary.

The following is a description of the operation of the exemplary molding machine illustrated and described herein and embodying the principles of the present invention.

The starting position of the machine is illustrated in Figs. 1, 2 and 6 and in which a pallet 50 has previously manually been placed within the mold cavity 26 so as to be supported upon the supporting members 46. The compression head 64 has been elevated to the position illustrated in these figures, and is held there, by the hydraulic unit 54. A suitable quantity of cement mixture, sufficient, for example, to approximately half fill the cavity 26, is introduced into the cavity from a suitable and convenient source of supply and the same is levelled manually upon the pallet 50 to an even depth. The electric switch controlling the vibrators 118 is then closed to afford a preliminary vibration of the cement mixture. A pair of reinforcing steel rods 122 are then placed manually upon the top of the levelled material within the mold cavity and the remainder of the required amount of cement mixture to form an elongated cement product of predetermined size is then placed within the mold cavity 26 so as to cover and completely imbed the reinforcing steel rods 122 within the exemplary lintel 124 to be molded by the machine. It will be understood of course that the foregoing description of the product is merely exemplary, different dispositions of reinforcing rods may be used as well as a different number thereof. Also, the product may comprise a post or pillar or any other suitable type of preferably elongated cement product which the machine is capable of molding.

After the total required quantity of cement mixture is introduced into the mold cavity and has been levelled, the valve member 62 is manipulated to cause the hydraulic unit 54 to lower the compression head 64 into engagement with the deposited cement mixture. Simultaneously with such compression of the material by the hydraulic unit and compression member 64, the electric switch controlling the vibrators 118 is closed to cause simultaneous vibration and compression of the cement product. Compression and vibration takes place simultaneously or otherwise, as desired, for a predetermined period of time and the electric switch controlling the vibrators is then opened to stop such vibrating. It will be obvious of course that the vibrators 118 attached to the side members of the mold box 24 will effectively vibrate the entire amount of cement mixture within the mold cavity.

Following the compression and vibration of the product, the hydraulic valve member 62 is then actuated so as to cause the hydraulic unit 54 to elevate the compression head 64. At the commencement of such elevating movement of the compression head the connecting rods 106 will project considerably above said compression head but the head 64 will move vertically relative to the upper ends of said rods until the head engages nuts 112 and then continued movement of the compression head 64 by the hydraulic unit will cause the ejecting member 98 also to be elevated. The pallet engaging members 114 then will be moved against the pallet 50 so as to move the pallet and molded cement product 124 thereon upwardly out of the mold cavity 26 to the position thereof illustrated in Fig. 4. The pallet and product thereon may then be removed manually or otherwise from the members 114 and moved to a suitable curing rack.

The hydraulic valve member 62 is then manipulated in a manner to cause the hydraulic unit 54 to lower the compression head 64 to the position thereof illustrated in Figs. 1, 2 and 6 and such lowering of the compression head 64 will likewise lower the ejecting member 98 until the same engages the stop nuts 104. Such stop nuts will limit the downward movement of the ejecting member 98, including the pallet engaging members 114, to the position thereof illustrated in Figs. 1, 2 and 4. In normal operation, the shoes or feet 116 of the members 114 are either in the same plane as or below the upper surfaces of channel members 46 when the machine is arranged as shown in Figs. 1, 2 and 6 for purposes of receiving a batch of cement mixture within the mold cavity 26 and the pallet 50 is supported by the channel members 46. Thus, when the compression head 64 is lowered toward and into the mold cavity from its position illustrated in Figs. 1, 2 and 6, such further downward movement of the compression head 64 will be relative to the rods 106, the latter slidably passing through the guide bearings formed in end blocks 68 therefor.

While the invention has been shown and illustrated in its several preferred embodiments, and has included certain details, it should be understood that the invention is not to be limited to the precise details herein illustrated and described since the same may be carried out in other ways falling within the scope of the invention as claimed.

I claim:

1. A molding machine for making elongated cement products comprising in combination, a frame comprising spaced vertical members and a header extending between and fixed to the upper portions thereof, elongated spaced parallel channel-like members extending horizontally between and fixed at the ends thereof relative to said vertical members below said header, said channel-like members having the smooth faces thereof in spaced opposition to each other, block-like end members connected to the lower ends of said vertical members and extending between and secured to the smooth inner faces of the ends of said channel-like members and therewith defining the sides and ends of an elongated mold cavity arranged to receive closely an elongated pallet to comprise a bottom for said mold cavity, pallet supporting members extending across said spaced members transversely at intervals and fixed to the bottom surfaces thereof to support directly a pallet within the bottom of said mold cavity, a hydraulic cylinder and piston unit supported by said header, a compression head fixed thereto and movable thereby vertically between said mold cavity and head, an elongated pallet ejecting member extending in parallelism to said mold cavity beneath the same and vertically movable from one position below said cavity to a pallet ejecting position above said one position, said ejecting member having spaced upstanding members fixed thereto and movable thereby vertically into engagement with a pallet when a pallet is positioned upon and supported by said supporting members, rods positioned adjacent said vertical members and extending vertically between said ejecting member and compression head adjacent the opposite ends thereof, said compression head being movable by said hydraulic unit toward said mold cavity to compress a batch of cement mixture deposited within said mold cavity to compress a batch of cement mixture deposited within said mold cavity against a pallet supported therein and upon said head being elevated said rods and ejecting member being movable thereby into engagement with a pallet and serving to elevate said pallet and compressed molded cement products from said mold cavity, and legs connected to said block-like end members and depending therefrom to support said machine above a floor surface sufficiently to permit said pallet ejecting member to move to its lowest required position.

2. The molding machine set forth in claim 1 further characterized by including stop means comprising extension members depending from said vertical members of said frame and each extension including a stop nut adjustably threaded onto the lower end thereof and respectively engageable by the opposite end portions of said ejecting member, the opposite ends of said ejecting member having bearings therein slidably receiving said extensions.

3. A molding machine for making elongated cement products comprising in combination, a frame comprising spaced vertical members and a header extending between and fixed to the upper portions thereof, elongated spaced parallel members extending horizontally between and fixed at the ends thereof relative to said vertical members below said header, said parallel members having opposed vertical mold surfaces, block-like end members extending between and secured to said vertical surfaces of the ends of said spaced members and the lower ends of said spaced vertical members extending through and fixed to said end members, said parallel and end members respectively defining the sides and ends of an elongated mold cavity and said end members each having a vertical guide bearing therein, pallet supporting means fixed to the bottoms of said parallel members to support directly a pallet within the bottom of said mold cavity, a hydraulic cylinder and piston unit carried by said header, a compression head fixed thereto and movable thereby vertically between said mold cavity and header, an elongated pallet ejecting member parallel to and below said mold cavity and substantially coextensive therewith in length, said ejecting member being vertically movable toward said cavity to engage and eject a pallet therefrom, and lifting rods slidably disposed within the guide bearings of said end members and extending vertically between said ejecting member and compression head adjacent the opposite ends thereof, said compression head being movable by said hydraulic unit toward said mold cavity to compress a batch of cement mixture deposited within said mold cavity against a pallet supporting therein and upon said head being elevated said lifting rods being actuated thereby to elevate said ejecting member to cause said pallet and molded cement product to be removed upwardly from said mold cavity.

4. A compression head for a molding machine for making elongated cement block-like products and comprising an elongated supporting member mountable for movement toward and from a mold cavity and longitudinally slotted in the lower portion thereof, a plurality of compression members positionable in end to end relationship against one of the surfaces of said supporting member, lugs projecting upward from said compression members and interfitting within said slot in said supporting member and operable to slide therein and align said compression members accurately therewith in end to end relationship to provide a substantially uninterrupted molding surface, and means detachably securing said compression members to said supporting member.

5. The compression head set forth in claim 4 further characterized by the longitudinal slot in said supporting member extending vertically therethrough and bolts being insertable within said slot and threadable into said compression members detachably to secure said compression members to said supporting member.

6. The compression head set forth in claim 4 further characterized by said compression members being at least three in number and the ends thereof abutting, said abutting ends having slidably interfitting projection and recess means extending longitudinally of said members and functioning accurately to position said end to end positioned compressing members lengthwise relative to said supporting member and facilitating the support of the intermediate compression members while being finally positioned upon said supporting member.

7. The compression head set forth in claim 4 further characterized by said compression members being at least three in number and the intermediate compression member having recesses in the ends of the lower surfaces thereof and the other compression members having laterally projecting means extending from the lower surfaces of said members toward said intermediate compression member and slidably receivable within said recesses.

References Cited in the file of this patent

UNITED STATES PATENTS

| | | |
|---|---|---|
| 839,125 | Dyer | Dec. 25, 1906 |
| 849,214 | Daughenbaugh et al. | Apr. 2, 1907 |
| 955,063 | Fisher | Apr. 12, 1910 |
| 1,301,954 | McGary | Apr. 29, 1919 |
| 1,564,364 | Morrow | Dec. 8, 1925 |
| 1,677,677 | Irwin | July 17, 1928 |
| 2,542,584 | Sherman et al. | Feb. 20, 1951 |
| 2,583,597 | Ryner | Jan. 29, 1952 |